C. G. PURDY.
Machines for Polishing Moldings.
No. 199,166. Patented Jan. 15, 1878.
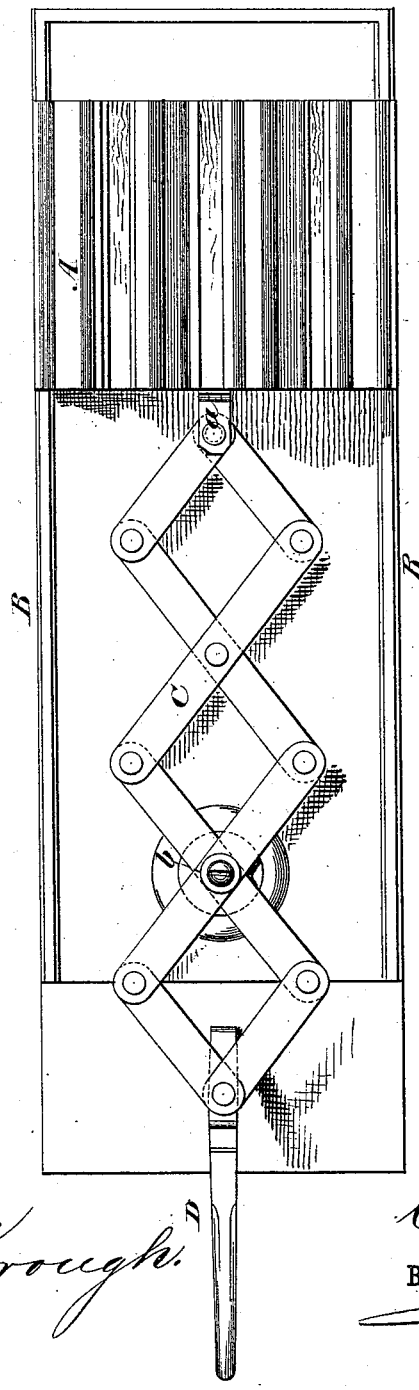
WITNESSES:
Edgar Tate
J. H. Scarborough.
INVENTOR:
C. G. Purdy.
BY Munn & Co
ATTORNEYS.

UNITED STATES PATENT OFFICE.

CHARLES G. PURDY, OF NEW YORK, N. Y., ASSIGNOR TO HIMSELF AND MARX KLINE, OF SAME PLACE.

IMPROVEMENT IN MACHINES FOR POLISHING MOLDINGS.

Specification forming part of Letters Patent No. 199,166, dated January 15, 1878; application filed June 25, 1877.

*To all whom it may concern:*

Be it known that I, CHARLES G. PURDY, of the city, county, and State of New York, have invented a new and Improved Machine for Polishing Moldings, of which the following is a specification:

My invention consists of a movable bed for carrying the moldings, which is placed upon suitable ways, and moved by the mechanical device commonly known as "lazy-tongs."

The object of the invention is to construct a machine for carrying moldings under a polisher in which the required stroke may be secured without cumbrous or complicated machinery.

In the drawing, which is a plan view of my improved machine, A is a movable bed, of suitable width and length to receive several pieces of molding. The said bed is placed upon ways B, and is moved by the well-known lazy-tongs C, which are pivoted to an ear, $a$, that projects from the end of the bed A. They are also pivoted at $b$ to the bed that supports the ways B, and are connected with a lever, D, the lower end of which is fulcrumed below the lazy-tongs. The motion of the lever D is multiplied in proportion to the number of sections or joints in the lazy-tongs between the bed A and pivot $b$.

The lever D may be worked either by hand or by any convenient power, or the power may be applied directly to the portion of the lazy-tongs lying outside of the pivot $b$.

Motion being imparted to the lever D, the bed A is moved back and forth over the ways, carrying the moldings under the polishing-pads. A slight motion of the lever produces a considerable movement of the bed.

Instead of moving the bed and moldings, the polishing-pads may be attached to the end of the lazy-tongs and carried over the moldings, which may be fixed.

Having thus fully described my invention, I claim as new and desire to secure by Letters Patent—

The combination of a movable bed, A, placed on suitable ways, the lazy-tongs C, pivot $b$, and the lever D, substantially as shown and described.

CHARLES G. PURDY.

Witnesses:
C. SEDGWICK,
ALEX. F. ROBERTS.